United States Patent
Masuda

(10) Patent No.: US 12,208,657 B2
(45) Date of Patent: Jan. 28, 2025

(54) CONTROLLER, VEHICLE, AND CONTROL METHOD

(71) Applicant: Robert Bosch GmbH, Stuttgart (DE)

(72) Inventor: Makoto Masuda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/928,036

(22) PCT Filed: May 10, 2021

(86) PCT No.: PCT/IB2021/053935
§ 371 (c)(1),
(2) Date: Nov. 28, 2022

(87) PCT Pub. No.: WO2021/240276
PCT Pub. Date: Dec. 2, 2021

(65) Prior Publication Data
US 2023/0211642 A1     Jul. 6, 2023

(30) Foreign Application Priority Data
May 29, 2020   (JP) .................. 2020-094408

(51) Int. Cl.
*B60G 17/016*   (2006.01)
*B60G 17/018*   (2006.01)
*B60G 17/06*    (2006.01)

(52) U.S. Cl.
CPC ........... *B60G 17/06* (2013.01); *B60G 17/016* (2013.01); *B60G 17/018* (2013.01);
(Continued)

(58) Field of Classification Search
CPC .... B60G 17/06; B60G 17/016; B60G 17/018; B60G 2300/07; B60G 2500/10;
(Continued)

(56) References Cited

U.S. PATENT DOCUMENTS

| | | | |
|---|---|---|---|
| 9,051,988 B2 | 6/2015 | Battlogg et al. | |
| 2013/0341843 A1* | 12/2013 | Battlogg | F16F 9/532 188/267.2 |

(Continued)

FOREIGN PATENT DOCUMENTS

| | | | | |
|---|---|---|---|---|
| CN | 105313632 A | * | 2/2016 | ........... B60G 17/016 |
| CN | 109764078 A | | 5/2019 | |

(Continued)

OTHER PUBLICATIONS

International Search Report and Written Opinion for Application No. PCT/IB2021/053935 dated Sep. 23, 2021 (12 pages).

*Primary Examiner* — Jason D Shanske
*Assistant Examiner* — Daniel M. Keck
(74) *Attorney, Agent, or Firm* — Michael Best & Friedrich LLP

(57) ABSTRACT

The present invention obtains a controller capable of improving riding comfort of an occupant at the time when a vehicle that has jumped lands on the ground in comparison with the background art.

The controller according to the present invention is a controller that is mounted to a vehicle including a shock absorber in a damping force adjustment type between a vehicle body and a wheel and controls a damping force of the shock absorber. The controller includes: a jump detecting section detecting that the vehicle has jumped; and a control section that executes landing damping force control for restricting the damping force of the shock absorber during compression to be equal to or smaller than a prescribed damping force when the jump detecting section detects a jump of the vehicle.

8 Claims, 5 Drawing Sheets

(52) U.S. Cl.
CPC ...... *B60G 2300/07* (2013.01); *B60G 2500/10* (2013.01); *B60G 2600/182* (2013.01); *B60G 2800/91* (2013.01)

(58) Field of Classification Search
CPC ........... B60G 2600/182; B60G 2800/91; F16F 9/512; F16F 15/002
See application file for complete search history.

(56) References Cited

U.S. PATENT DOCUMENTS

| | | | | |
|---|---|---|---|---|
| 2017/0240017 | A1* | 8/2017 | Vandersmissen | B60G 17/06 |
| 2020/0307337 | A1* | 10/2020 | Ohno | B60G 17/0157 |
| 2020/0307340 | A1* | 10/2020 | Yao | B60G 17/0161 |

FOREIGN PATENT DOCUMENTS

| | | | | | |
|---|---|---|---|---|---|
| CN | 113183709 | A | * | 7/2021 | ......... B60G 17/0165 |
| CN | 114905909 | A | * | 8/2022 | |
| CN | 117325603 | A | * | 1/2024 | |
| CN | 117601613 | A | * | 2/2024 | |
| DE | 4230465 | A1 | * | 3/1993 | ........... B60G 17/018 |
| DE | 19530658 | A1 | * | 3/1996 | ......... B60G 17/0152 |
| DE | 102012012535 | A1 | | 1/2014 | |
| DE | 102021112874 | A1 | * | 4/2022 | ......... B60G 17/0165 |
| JP | H07179113 | A | | 7/1995 | |
| JP | 2954976 | B2 | | 9/1999 | |
| JP | 2005199944 | A | * | 7/2005 | ......... B60G 17/0182 |
| JP | 2008144685 | A | | 6/2008 | |
| JP | 2017165298 | A | | 9/2017 | |
| JP | 6378413 | B1 | * | 8/2018 | ......... B60G 17/0165 |
| JP | 6444472 | B1 | * | 12/2018 | ......... B60G 17/0161 |
| WO | 2019077761 | A1 | | 4/2019 | |
| WO | WO-2021044552 | A1 | * | 3/2021 | |

* cited by examiner

[FIG. 1]
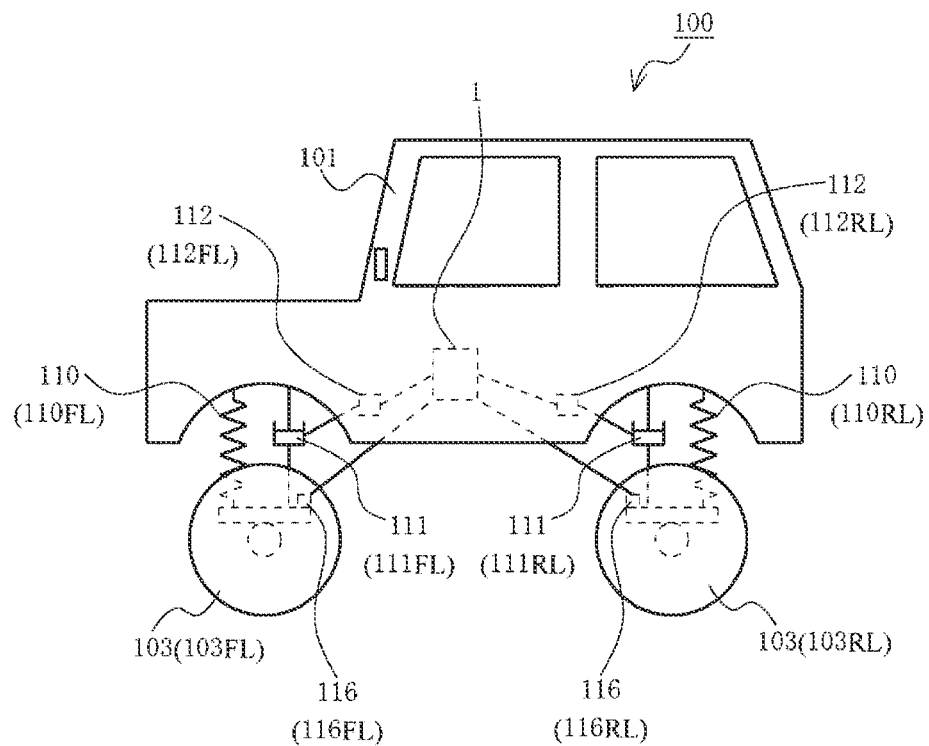
[FIG. 2]
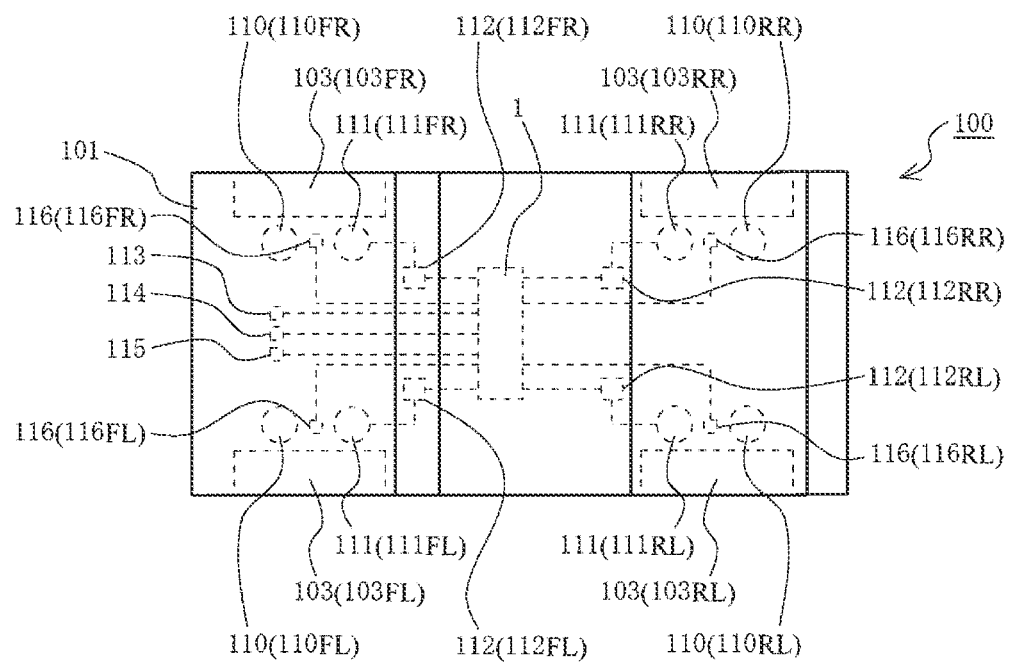

[FIG. 3]
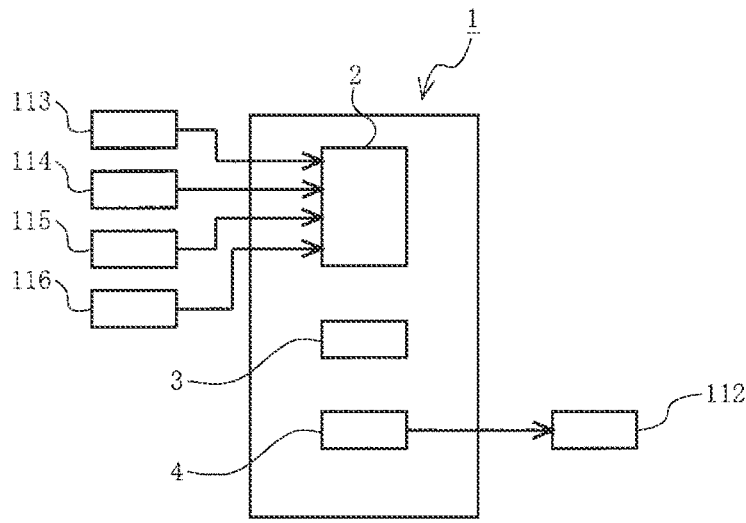
[FIG. 4]
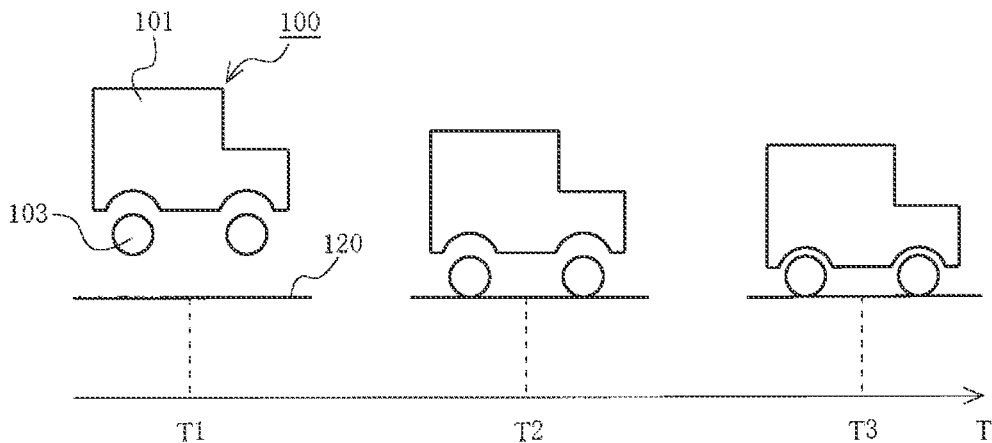
[FIG. 5]
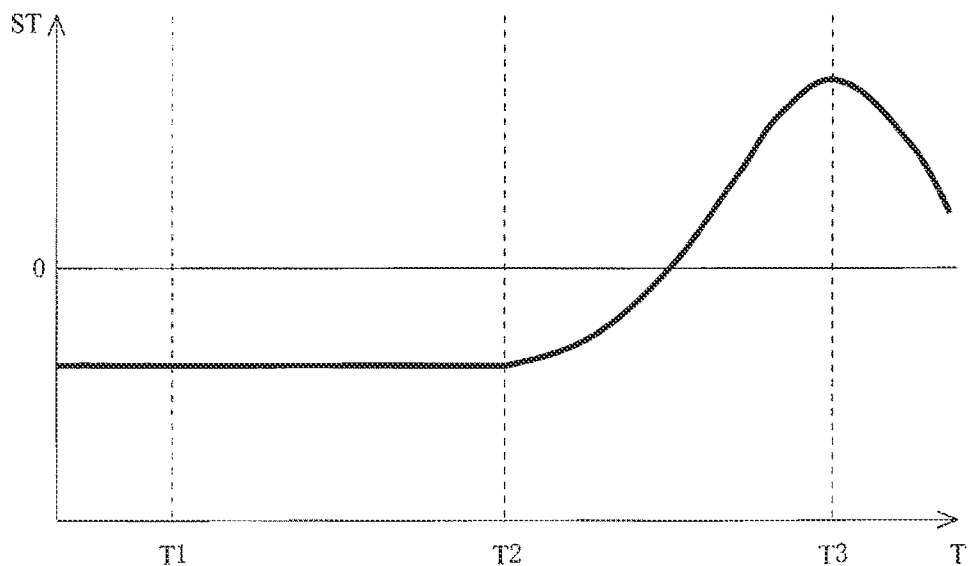

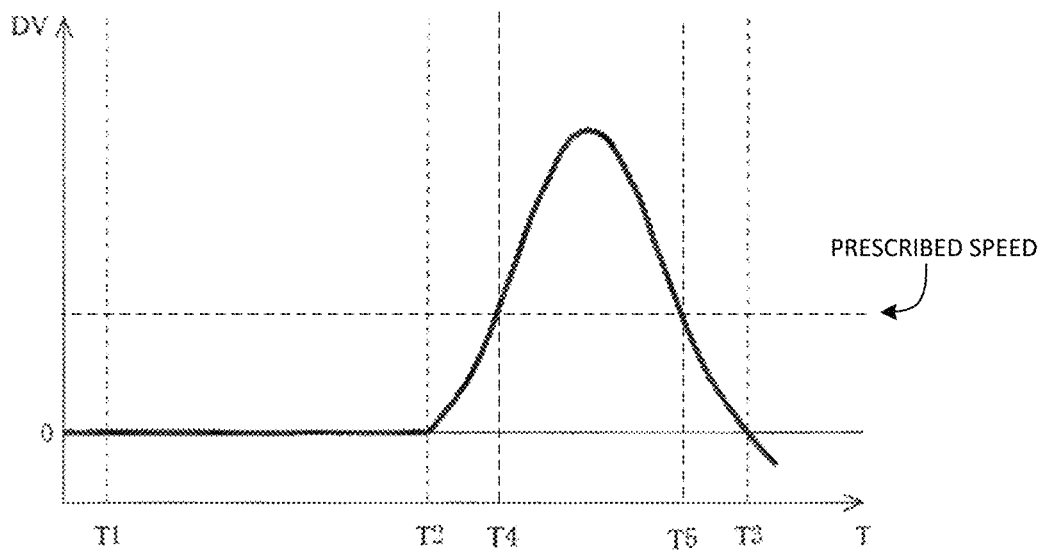
[FIG. 6]
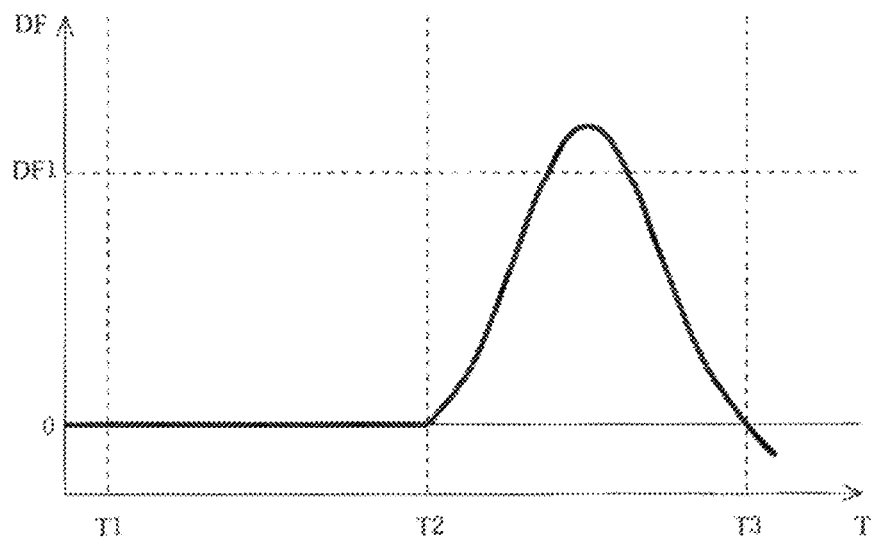
[FIG. 7]

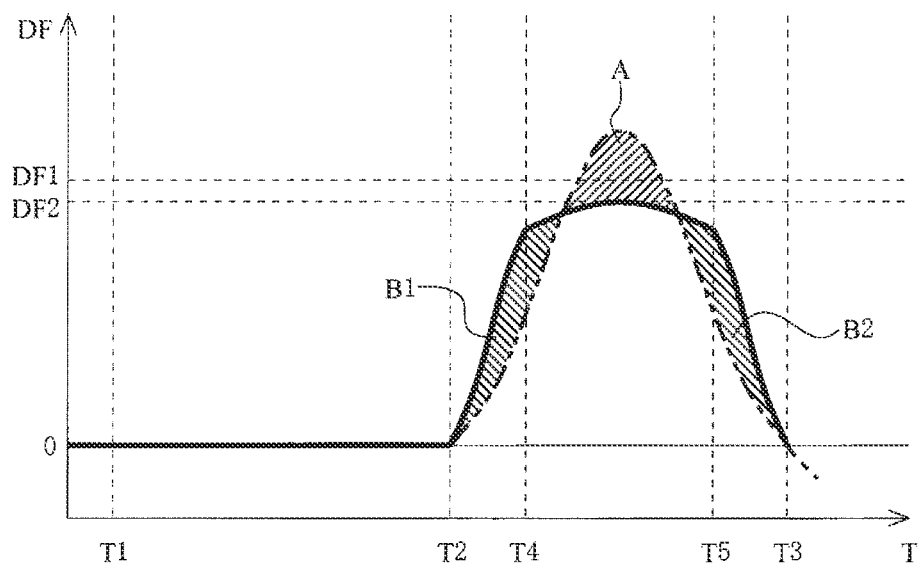
[FIG. 8]

[FIG. 9]
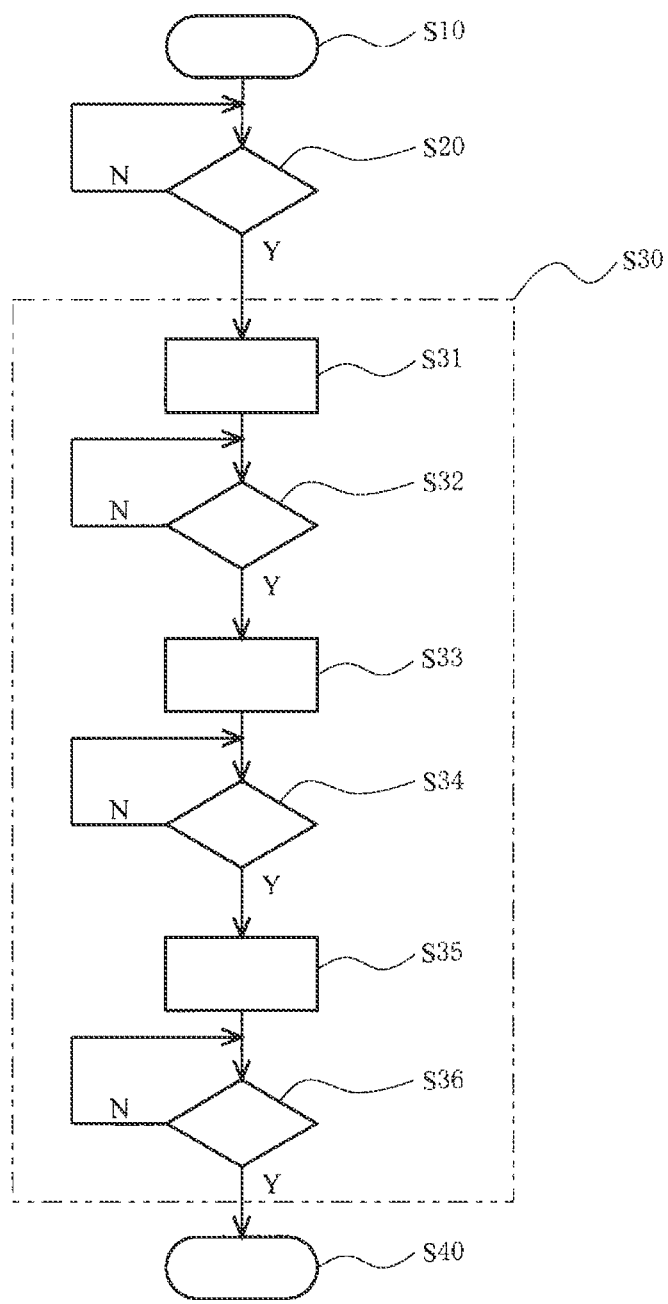

CONTROLLER, VEHICLE, AND CONTROL METHOD

BACKGROUND OF THE INVENTION

The present invention relates to a controller that controls a damping force of a shock absorber in a damping force adjustment type mounted to a vehicle, a vehicle including the controller, and a control method for a damping force of a shock absorber in a damping force adjustment type mounted to a vehicle.

Conventionally, a vehicle including a shock absorber, a damping force characteristic of which is fixed, between a vehicle body and each wheel has been known. In recent years, a vehicle including a shock absorber in a damping force adjustment type, a damping force characteristic of which can be changed by a controller, between the vehicle body and each of the wheels has also been proposed (see JP-A-7-179113).

SUMMARY OF THE INVENTION

For example, like an off-road vehicle or the like, there is a vehicle that possibly jumps during travel. A jump means a state where tires of all the wheels come off a road surface during the travel. When the vehicle that has jumped lands on the ground, the damping force characteristic of the shock absorber has to be changed. Otherwise, depending on a case, a damping force becomes insufficient, and the shock absorber reaches a so-called maximum stroke. That is, when the vehicle that has jumped lands on the ground, the shock absorber is compressed up to an end on a compression side, and a piston in the shock absorber collides with a stopper. As a result, an instantaneous shock is transmitted to an occupant, which worsens riding comfort of the occupant. In order to solve this problem, the damping force of the shock absorber has to be increased so as to prevent the shock absorber from reaching the maximum stroke. However, in the case where the damping force of the shock absorber is simply increased, the shock absorber becomes too stiff. As a result, the instantaneous shock is transmitted to the occupant after all, which worsens the riding comfort of the occupant.

The present invention has been made in view of the above-described problem as the background and therefore has a first purpose of obtaining a controller that is mounted to a vehicle including a shock absorber in a damping force adjustment type between a vehicle body and a wheel and controls a damping force of the shock absorber, the controller capable of improving riding comfort of an occupant at the time when the vehicle that has jumped lands on the ground in comparison with to the background art. The present invention has a second purpose of obtaining a vehicle including such a controller. The present invention has a third purpose of obtaining a control method for controlling a damping force of a shock absorber, the control method being used for a vehicle that includes a shock absorber in a damping force adjustment type between a vehicle body and a wheel and capable of improving riding comfort of an occupant at the time when the vehicle that has jumped lands on the ground in comparison with the background art.

A controller according to the present invention is a controller that is mounted to a vehicle including a shock absorber in a damping force adjustment type between a vehicle body and a wheel and controls a damping force of the shock absorber. The controller includes: a jump detecting section detecting that the vehicle has jumped; and a control section that executes landing damping force control to restrict the damping force of the shock absorber during compression to be equal to or smaller than a prescribed damping force when the jump detecting section detects a jump of the vehicle.

A vehicle according to the present invention includes: a vehicle body; a wheel; a shock absorber in a damping force adjustment type provided between the vehicle body and the wheel; and the controller according to the present invention.

A control method according to the present invention is a control method that is used for a vehicle including a shock absorber in a damping force adjustment type between a vehicle body and a wheel and controls a damping force of the shock absorber. The control method includes: a jump detection step for detecting that the vehicle has jumped; and a landing damping force control step for restricting the damping force of the shock absorber during compression to be equal to or smaller than a prescribed damping force when a jump of the vehicle is detected in the jump detection step.

The present invention is adopted for the vehicle including the shock absorber in the damping force adjustment type. Accordingly, in the vehicle, for which the present invention is adopted, the damping force of the shock absorber can be increased to the damping force with which the shock absorber does not reach the maximum stroke when the vehicle that has jumped lands on the ground. In addition, in the present invention, the damping force of the shock absorber during the compression is restricted to be equal to or smaller than the prescribed damping force when the jump of the vehicle is detected. Accordingly, in the vehicle, for which the present invention is adopted, it is possible to suppress the shock absorber from becoming too stiff when the vehicle that has jumped lands on the ground. Thus, in the present invention, it is possible to suppress an instantaneous shock from being transmitted to the occupant at the time when the vehicle that has jumped lands on the ground and to improve the riding comfort of the occupant at the time when the vehicle lands on the ground in comparison with the background art.

BRIEF DESCRIPTION OF THE DRAWINGS

FIG. 1 is a side view of a vehicle according to an embodiment of the present invention.

FIG. 2 is a plan view of the vehicle according to the embodiment of the present invention.

FIG. 3 is a block diagram illustrating a controller according to the embodiment of the present invention.

FIG. 4 is a view for illustrating behavior of the vehicle according to the embodiment of the present invention from a jumping state to a state after landing on the ground.

FIG. 5 is a graph illustrating behavior of a shock absorber in the case where a damping force characteristic of the shock absorber is not changed at the time when the vehicle according to the embodiment of the present invention performs operation illustrated in FIG. 4.

FIG. 6 is a graph illustrating a compression speed of the shock absorber when the shock absorber is operated as illustrated in FIG. 5.

FIG. 7 is a graph illustrating a damping force during compression of the shock absorber when the shock absorber is operated as illustrated in FIG. 5.

FIG. 8 is a graph illustrating a damping force of the shock absorber during the compression in the case where the vehicle according to the embodiment of the present invention performs the operation illustrated in FIG. 4 and the controller mounted to the vehicle executes landing damping force control.

FIG. 9 is a flowchart illustrating operation of the controller according to the embodiment of the present invention.

DETAILED DESCRIPTION

A description will hereinafter be made on an example of a controller, a vehicle, and a control method according to the present invention with reference to the drawings.

A description will hereinafter be made on a four-wheeled motor vehicle as the example of the vehicle according to the present invention. However, the vehicle according to the present invention may be a vehicle other than the four-wheeled motor vehicle. Examples of the vehicle other than the four-wheeled motor vehicle are a pedal-driven vehicle, a two-wheeled motor vehicle, a three-wheeled motor vehicle, and the like, each of which has at least one of an engine and an electric motor as a drive source. The pedal-driven vehicle means a vehicle in general that can travel forward on a road by a depression force applied to pedals. That is, the pedal-driven vehicles are a normal pedal-driven vehicle, an electrically-assisted pedal-driven vehicle, an electric pedal-driven vehicle, and the like. The two-wheeled motor vehicle or the three-wheeled motor vehicle means a so-called motorcycle, and the motorcycles are a bike, a scooter, an electric scooter, and the like.

A configuration, operation, and the like, which will be described below, constitute merely one example, and the present invention is not limited to a case with such a configuration, such operation, and the like. In the drawings, the same or similar members or portions will be denoted by the same reference sign or will not be denoted by the reference sign. A detailed structure will appropriately be illustrated in a simplified manner or will not be illustrated.

A description will hereinafter be made on a controller 1 according to an embodiment, a vehicle 100 including the controller 1, and a control method executed by the controller 1.

<Configurations of Vehicle and Controller>

FIG. 1 is a side view of the vehicle according to the embodiment of the present invention. FIG. 2 is a plan view of the vehicle according to the embodiment of the present invention. In FIG. 1 and FIG. 2, a left side of each sheet corresponds to a front side of the vehicle 100.

The vehicle 100 is an off-road vehicle and includes a vehicle body 101 and wheels 103. The vehicle 100 according to this embodiment is a four-wheeled motor vehicle and includes four wheels 103. More specifically, the vehicle 100 includes, as the wheels 103, a front left wheel 103FL, a front right wheel 103FR, a rear left wheel 103RL, and a rear right wheel 103RR.

The vehicle 100 also includes a spring 110 and a shock absorber 111. The spring 110 and the shock absorber 111 are provided between the vehicle body 101 and each of the wheels 103. Thus, the vehicle 100 includes four springs 110 and four shock absorbers 111. More specifically, the vehicle 100 includes, as the springs 110, a spring 110FL, a spring 110FR, a spring 110RL, and a spring 110RR. The vehicle 100 includes, as the shock absorbers 111, a shock absorber 111FL, a shock absorber 111FR, a shock absorber 111RL, and a shock absorber 111RR.

The spring 110FL and the shock absorber 111FL are provided between the vehicle body 101 and the front left wheel 103FL. The spring 110FR and the shock absorber 111FR are provided between the vehicle body 101 and the front right wheel 103FR. The spring 110RL and the shock absorber 111RL are provided between the vehicle body 101 and the rear left wheel 103RL. The spring 110RR and the shock absorber 111RR are provided between the vehicle body 101 and the rear right wheel 103RR.

The shock absorber 111 according to this embodiment is a shock absorber in a damping force adjustment type. That is, the shock absorber 111 is a shock absorber, a damping force characteristic of which can be changed. For this reason, the vehicle 100 includes an actuator 112 that adjusts a damping force of the shock absorber 111. The actuator 112 is provided for each of the shock absorbers 111. More specifically, the vehicle 100 includes four actuators 112. Further more specifically, the vehicle 100 includes, as the actuators 112, an actuator 112FL, an actuator 112FR, an actuator 112RL, an actuator 112RR. The actuator 112FL adjusts the damping force of the shock absorber 111FL. The actuator 112FR adjusts the damping force of the shock absorber 111FR. The actuator 112RL adjusts the damping force of the shock absorber 111RL. The actuator 112RR adjusts the damping force of the shock absorber 111RR. Any of various known shock absorbers can be used as the shock absorber 111 as long as the shock absorber is of the damping force adjustment type.

The controller 1 is electrically connected to the actuator 112. The controller 1 outputs a command signal to the actuator 112, and the command signal corresponds to the damping force of the shock absorber 111. That is, the controller 1 is configured to control the damping force of the shock absorber 111 via the actuator 112. More specifically, in this embodiment, the controller 1 outputs the command signal corresponding to the damping force of the shock absorber 111FL to the actuator 112FL. The controller 1 outputs the command signal corresponding to the damping force of the shock absorber 111FR to the actuator 112FR. The controller 1 outputs the command signal corresponding to the damping force of the shock absorber 111RL to the actuator 112RL. The controller 1 outputs the command signal corresponding to the damping force of the shock absorber 111RR to the actuator 112RR.

Here, in a state where the compression speed of the shock absorber 111 is the same, the damping force of the shock absorber 111 differs by the damping force characteristic of the shock absorber 111. For example, the damping force characteristic of the shock absorber 111 is changed to be hard. In such a case, in the state where the compression speed of the shock absorber 111 remains the same, the damping force of the shock absorber 111 is increased. Meanwhile, for example, the damping force characteristic of the shock absorber 111 is changed to be soft. In such a case, in the state where the compression speed of the shock absorber 111 remains the same, the damping force of the shock absorber 111 is reduced. For this reason, in this embodiment, the controller 1 outputs the command signal corresponding to the damping force characteristic of the shock absorber 111 to the actuator 112. That is, the controller 1 is configured to control the damping force characteristic of the shock absorber 111 via the actuator 112. For example, in the case where the shock absorber 111 is a hydraulic shock absorber, the controller 1 controls a cross-sectional area of a channel, through which hydraulic oil for the shock absorber 111 flows, so as to control the damping force characteristic of the shock absorber 111. Meanwhile, for example, in the case where the shock absorber 111 is a magnetic fluid shock absorber, the controller 1 controls a magnetic field or an electric field acting on a magnetic fluid for the shock absorber 111, and kinetic viscosity of the magnetic fluid, so as to control the damping force characteristic of the shock absorber 111.

The command signal that is output from the controller 1 to the actuator 112 differs by a type of the shock absorber 111 and a type of the actuator 112. For example, in the case where the shock absorber 111 is configured that the damping force characteristic thereof is changed according to a value of an electric current into the actuator 112, the command signal output from the controller 1 is the electric current. That is, the controller 1 outputs the electric current corresponding to the damping force characteristic of the shock absorber 111 to the actuator 112. Meanwhile, for example, in the case where the shock absorber 111 is configured that the damping force characteristic thereof is changed according to a value of a voltage into the actuator 112, the command signal output from the controller 1 is the voltage. That is, the controller 1 outputs the voltage corresponding to the damping force characteristic of the shock absorber 111 to the actuator 112.

The vehicle 100 according to this embodiment also includes: a longitudinal acceleration sensor 113, a lateral acceleration sensor 114, a signal output device 115, and an unsprung acceleration sensor 116, each of which is electrically connected to the controller 1.

The longitudinal acceleration sensor 113 is provided to the vehicle body 101 and detects longitudinal acceleration of the vehicle body 101. The lateral acceleration sensor 114 is provided to the vehicle body 101 and detects lateral acceleration of the vehicle body 101.

The signal output device 115 outputs a signal corresponding to a speed of the vehicle 100. Conventionally, various configurations are adopted to calculate the speed of the vehicle. For this reason, as the signal corresponding to the speed of the vehicle 100, any of various signals that have conventionally been used to calculate the speed of the vehicle can be used. The signal output device 115 is a signal output device that outputs any of such conventionally known signals. For example, a configuration to calculate the speed of the vehicle on the basis of a gear stage of a transmission and an engine speed has conventionally been known. In the case where such a configuration is adopted for the vehicle 100, the signal output device 115 is a device that outputs a signal related to the gear stage of the transmission and the engine speed. In addition, for example, a configuration to calculate the speed of the vehicle on the basis of a wheel rotational frequency has been known. In the case where such a configuration is adopted for the vehicle 100, the signal output device 115 is a wheel rotational frequency sensor.

The unsprung acceleration sensor 116 detects vertical acceleration of an unsprung portion of the vehicle 100. In the vehicle 100, the unsprung portion of the vehicle 100 is a portion on the wheel 103 side with the shock absorber 111 being a reference. For example, the wheel 103, an unillustrated hub, an unillustrated axle, and the like correspond to the unsprung portion of the vehicle 100. In this embodiment, the vehicle 100 includes, as the unsprung acceleration sensors 116, an unsprung acceleration sensor 116FL, an unsprung acceleration sensor 116FR, an unsprung acceleration sensor 116RL, and an unsprung acceleration sensor 116RR.

The unsprung acceleration sensor 116FL is provided at a position near the shock absorber 111FL in the unsprung portion of the vehicle 100. The unsprung acceleration sensor 116FL detects the vertical acceleration that is generated to the unsprung portion near the shock absorber 111FL. The unsprung acceleration sensor 116FR is provided at a position near the shock absorber 111FR in the unsprung portion of the vehicle 100. The unsprung acceleration sensor 116FR detects the vertical acceleration that is generated to the unsprung portion near the shock absorber 111FR. The unsprung acceleration sensor 116RL is provided at a position near the shock absorber 111RL in the unsprung portion of the vehicle 100. The unsprung acceleration sensor 116RL detects the vertical acceleration that is generated to the unsprung portion near the shock absorber 111RL. The unsprung acceleration sensor 116RR is provided at a position near the shock absorber 111RR in the unsprung portion of the vehicle 100. The unsprung acceleration sensor 116RR detects the vertical acceleration that is generated to the unsprung portion near the shock absorber 111RR.

The number and the arrangement positions of the unsprung acceleration sensors 116 merely constitute one example. Any number and any arrangement position of the unsprung acceleration sensor 116 can be adopted as long as the vertical acceleration that is generated to the unsprung portion near each of the shock absorbers 111 can be calculated by detection, estimation, or the like. The longitudinal acceleration sensor 113, the lateral acceleration sensor 114, the signal output device 115, and the unsprung acceleration sensor 116 may separately be provided, or at least two thereof may be configured as one unit. For example, a so-called inertial measurement unit may be used as the longitudinal acceleration sensor 113 and the lateral acceleration sensor 114.

Here, for example, like an off-road vehicle or the like, there is a vehicle that possibly jumps during travel. A jump means a state where tires of all the wheels come off a road surface during the travel. When the vehicle that has jumped lands on the ground and the damping force of the shock absorber is small, the shock absorber reaches a so-called maximum stroke. That is, when the vehicle that has jumped lands on the ground, the shock absorber is compressed to an end on a compression side, and a piston in the shock absorber collides with a stopper. As a result, an instantaneous shock is transmitted to an occupant, which worsens riding comfort of the occupant. In order to solve this problem, the damping force of the shock absorber has to be increased so as to prevent the shock absorber from reaching the maximum stroke. However, when the damping force of the shock absorber is simply increased, the shock absorber becomes too stiff. As a result, the instantaneous shock is transmitted to the occupant after all, which worsens the riding comfort of the occupant.

Meanwhile, the controller 1 according to this embodiment controls the damping force of the shock absorber 111 in a manner to prevent the damping force of the shock absorber 111 from becoming excessively large while suppressing the shock absorber 111 from reaching the maximum stroke when the vehicle 100 that has jumped lands on the ground. A description will hereinafter be made on a detailed configuration of an example of the controller 1 that controls the damping force of the shock absorber 111 just as described.

<Detailed Configuration of Controller>

FIG. 3 is a block diagram illustrating the controller according to the embodiment of the present invention.

The controller 1 includes a receiving section 2, a jump detecting section 3, and a control section 4. The receiving section 2 is a functional section that receives detection values of the longitudinal acceleration sensor 113, the lateral acceleration sensor 114, the signal output device 115, and the unsprung acceleration sensor 116.

The jump detecting section 3 is a functional section detecting that the vehicle 100 has jumped. In this embodiment, the jump detecting section 3 detects that the vehicle 100 has jumped on the basis of the detection values of the longitudinal acceleration sensor 113 and the lateral acceleration sensor 114. More specifically, in a state where the vehicle 100 jumps, tires of all the wheels 103 are brought into a state of coming off the road surface. Thus, in the state where the vehicle 100 jumps, a propelling force does not act on the vehicle 100. As a result, in the state where the vehicle 100 jumps, the longitudinal acceleration of the vehicle body 101, which is detected by the longitudinal acceleration sensor 113, is reduced. In addition, in the state where the vehicle 100 jumps, the lateral acceleration of the vehicle body 101, which is detected by the lateral acceleration sensor 114, is reduced. Accordingly, in this embodiment, the jump detecting section 3 determines that the vehicle 100 has jumped when the detection value of the longitudinal acceleration sensor 113 becomes smaller than a prescribed threshold value and the detection value of the lateral acceleration sensor 114 becomes smaller than a prescribed threshold value. The threshold value of the longitudinal acceleration sensor 113 and the threshold value of the lateral acceleration sensor 114 may not be the same value.

Here, the above-described jump detection method for the vehicle 100 by the jump detecting section 3 is merely one example. For example, in the case where the vehicle 100 includes a vertical acceleration sensor that detects the vertical acceleration of the vehicle body 101, the jump detecting section 3 may detect that the vehicle 100 has jumped on the basis of a detection value of the vertical acceleration sensor. More specifically, in the state where the vehicle 100 jumps, the tires of all the wheels 103 come off the road surface. Thus, input from the road surface to the vehicle body 101 no longer exists, and the vertical acceleration of the vehicle body 101 is reduced. Thus, the jump detecting section 3 may detect that the vehicle 100 has jumped when the detection value of the vertical acceleration sensor becomes smaller than a prescribed threshold value.

For example, in the case where the vehicle 100 includes a stroke sensor that measures a relative distance between the vehicle body 101 and the unsprung portion, the jump detecting section 3 may detect that the vehicle 100 has jumped on the basis of a detection value of the stroke sensor. More specifically, in a state where the vehicle 100 travels on the road surface, weight of the vehicle body 101 is applied to the spring 110 and the shock absorber 111. Meanwhile, in the state where the vehicle 100 jumps, the weight of the vehicle body 101 is not applied to the spring 110 and the shock absorber 111. Accordingly, the relative distance between the vehicle body 101 and the unsprung portion becomes longer in the state where the vehicle 100 jumps than in the state where the vehicle 100 travels on the road surface. In this way, the jump detecting section 3 can detect that the vehicle 100 has jumped on the basis of the detection value of the stroke sensor. Here, a method for calculating the relative distance between the vehicle body and the unsprung portion on the basis of the vertical acceleration of the vehicle body and the vertical acceleration of the unsprung portion has conventionally been known. Thus, in the case where the vehicle 100 includes the vertical acceleration sensor that detects the vertical acceleration of the vehicle body 101, the jump detecting section 3 may calculate the relative distance between the vehicle body 101 and the unsprung portion on the basis of the detection value of the vertical acceleration sensor and the detection value of the unsprung acceleration sensor 116 and may thereby detect that the vehicle 100 has jumped.

The stroke sensor has a long arm section. Thus, in the case where such a stroke sensor is used for the off-road vehicle, it is concerned that the arm section of the stroke sensor contacts a rock, a branch, or the like, which causes failure of the stroke sensor. For this reason, the vehicle 100 is configured not to use the stroke sensor. In this way, it is possible to improve durability of the vehicle 100.

The control section 4 is a functional section that executes landing damping force control. The landing damping force control is control to restrict the damping force of the shock absorber 111 during compression to be equal to or smaller than a prescribed damping force when the jump detecting section 3 detects the jump of the vehicle 100.

The thus-configured controller 1 is mounted to the vehicle 100 that includes the shock absorber 111 in the damping force adjustment type. Accordingly, in the vehicle 100, the damping force of the shock absorber 111 can be increased to such a damping force that does not cause the shock absorber 111 to reach the maximum stroke when the vehicle 100 that has jumped lands on the ground. In addition, in the controller 1 according to this embodiment, when the jump detection section 3 detects the jump of the vehicle 100, the control section 4 restricts the damping force of the shock absorber 111 during the compression to be equal to or smaller than the prescribed damping force by the landing damping force control. Accordingly, in the vehicle 100, to which the controller 1 is mounted, it is possible to suppress the shock absorber 111 from becoming too stiff at the time when the vehicle 100 that has jumped lands on the ground. Thus, the controller 1 according to this embodiment can suppress an instantaneous shock from being transmitted to the occupant at the time when the vehicle 100 that has jumped lands on the ground and can improve the riding comfort of the occupant at the time when the vehicle 100 lands on the ground in comparison with the background art.

Here, in the landing damping force control, the control section 4 of the controller 1 according to this embodiment suppresses an increase in the stroke of the shock absorber 111, which is caused by the restriction of the damping force of the shock absorber 111 during the compression and thereby further improves the riding comfort of the occupant at the time when the vehicle 100 lands on the ground. A description will hereinafter be made on an example of such landing damping force control. Hereinafter, in order to facilitate understanding of the landing damping force control according to this embodiment, a description will firstly be made on behavior of the vehicle 100 in the case where the maximum stroke of the shock absorber 111 is suppressed without changing the damping force characteristic of the shock absorber 111. Thereafter, a description will be made on the behavior of the vehicle 100 in the case where the landing damping force control according to this embodiment is executed.

FIG. 4 is a view for illustrating the behavior of the vehicle according to the embodiment of the present invention from a jumping state to a state after landing on the ground. A horizontal axis T illustrated in FIG. 4 represents time.

The vehicle 100 that is jumping at time T1 lands on a road surface 120 at time T2. Kinetic energy at the time of landing of the vehicle 100 is absorbed by the shock absorber 111 when the kinetic energy is converted into thermal energy during the compression of the shock absorber 111. Then, at time T3, the shock absorber 111 of the vehicle 100 is brought into the most compressed state. The control section 4 of the controller 1 executes the landing damping force control in a first compression process of the shock absorber 111 after the jump detecting section 3 detects the jump of the vehicle 100.

That is, the control section 4 executes the landing damping force control in a period from the time T2 to the time T3 in FIG. 4.

FIG. 5 is a graph illustrating behavior of the shock absorber in the case where the damping force characteristic of the shock absorber is not changed at the time when the vehicle according to the embodiment of the present invention performs the operation illustrated in FIG. 4. A horizontal axis T illustrated in FIG. 5 represents the time. A vertical axis ST illustrated in FIG. 5 represents the stroke of the shock absorber 111. In this vertical axis ST, a state where the vehicle 100 is stopped on the road surface 120 is set to 0 as a reference state. In addition, this vertical axis ST has a positive value in a compression direction of the shock absorber 111 from the reference state and has a negative value in an extension direction of the shock absorber 111 from the reference state. Furthermore, the damping force of the shock absorber 111, the behavior of which is illustrated in FIG. 5, is set to such a magnitude that can suppress the maximum stroke of the shock absorber 111.

At the time T1, the vehicle 100 is jumping. Thus, at the time T1, the weight of the vehicle body 101 is not applied to the spring 110 and the shock absorber 111. For this reason, the shock absorber 111 is in an extended state from the reference state. When the vehicle 100 lands on the road surface 120 at the time t2, the weight of the vehicle body 101 is applied to the shock absorber 111, and the shock absorber 111 is compressed. Then, at the time T3, the shock absorber 111 of the vehicle 100 is brought into the most compressed state.

FIG. 6 is a graph illustrating a compression speed of the shock absorber when the shock absorber is operated as illustrated in FIG. 5. A horizontal axis T illustrated in FIG. 6 represents the time. A vertical axis DV illustrated in FIG. 6 represents the compression speed of the shock absorber 111.

When the vehicle 100 lands on the road surface 120 at the time T2 and the shock absorber 111 starts being compressed, the compression speed of the shock absorber 111 is gradually increased. In addition, in a compression process of the shock absorber 111, the kinetic energy at the time of landing of the vehicle 100 is converted into the thermal energy, and the kinetic energy is thereby absorbed by the shock absorber 111. Accordingly, the compression speed of the shock absorber 111 is gradually reduced while the shock absorber 111 is compressed. Then, at the time T3, at which the shock absorber 111 of the vehicle 100 is the most compressed, the compression speed of the shock absorber 111 becomes zero.

FIG. 7 is a graph illustrating the damping force during the compression of the shock absorber when the shock absorber is operated as illustrated in FIG. 5. A horizontal axis T illustrated in FIG. 7 represents the time. A vertical axis DF illustrated in FIG. 7 represents the damping force of the shock absorber 111 during the compression.

The damping force of the shock absorber 111 corresponds to a function of the compressed/extended speed of the shock absorber 111. Thus, in the case where the damping force characteristic of the shock absorber 111 is not changed, a waveform that represents the damping force of the shock absorber 111 during the compression is the same as a waveform that represents the compression speed of the shock absorber 111. More specifically, when the vehicle 100 lands on the road surface 120 at the time T2 and the compression speed of the shock absorber 111 is increased, the damping force of the shock absorber 111 during the compression is also increased. Then, when the compression speed of the shock absorber 111 starts being reduced, the damping force of the shock absorber 111 during the compression is also reduced. At the time T3, at which the shock absorber 111 of the vehicle 100 is the most compressed, the damping force of the shock absorber 111 during the compression becomes zero.

As illustrated in FIG. 5 to FIG. 7, in the case where the maximum stroke of the shock absorber 111 is suppressed without changing the damping force characteristic of the shock absorber 111, as described above, the shock absorber may become too stiff. As a result, when the vehicle 100 lands on the ground, the instantaneous shock may be transmitted to the occupant, which may worsen the riding comfort of the occupant. For example, in the case where the damping force of the shock absorber 111 becomes larger than a prescribed damping force DF1 illustrated in FIG. 7, the instantaneous shock may be transmitted to the occupant during landing on the vehicle 100, which may worsen the riding comfort of the occupant.

As described above, in the landing damping force control that is executed after landing of the vehicle 100, the control section 4 of the controller 1 according to this embodiment restricts the damping force of the shock absorber 111 during the compression to be equal to or smaller than the prescribed damping force DF1. Then, when the vehicle 100 that has jumped lands on the ground, the control section 4 suppresses the shock absorber 111 from becoming too stiff, suppresses the instantaneous shock from being transmitted to the occupant, and thereby improves the riding comfort of the occupant in comparison with the background art. As will be described later in FIG. 8, in the landing damping force control, the control section 4 of the controller 1 suppresses the increase in the stroke of the shock absorber 111, which is caused by the restriction of the damping force of the shock absorber 111 during the compression and thereby further improves the riding comfort of the occupant at the time when the vehicle 100 lands on the ground.

FIG. 8 is a graph illustrating the damping force of the shock absorber during the compression in the case where the vehicle according to the embodiment of the present invention performs the operation illustrated in FIG. 4 and the controller mounted to the vehicle executes the landing damping force control. A horizontal axis T illustrated in FIG. 8 represents the time. A vertical axis DF illustrated in FIG. 8 represents the damping force of the shock absorber 111 during the compression. In FIG. 8, the damping force of the shock absorber 111 during the compression in the case where the damping force characteristic of the shock absorber 111 is not changed, that is, the waveform illustrated in FIG. 7 is also indicated by a two-dot chain line.

As illustrated in FIG. 8, in the landing damping force control that is executed after landing of the vehicle 100, the control section 4 of the controller 1 according to this embodiment controls the damping force characteristic of the shock absorber 111 such that the damping force of the shock absorber 111 during the compression approximates a target damping force DF2 that is a damping force equal to or smaller than the prescribed damping force DF1. By controlling the damping force characteristic of the shock absorber 111 as in this embodiment, when the vehicle 100 that has jumped lands on the ground, the damping force of the shock absorber 111 during the compression can be restricted to be equal to or smaller than the prescribed damping force DF1. In this way, it is possible to suppress the instantaneous shock from being transmitted to the occupant.

In addition, by controlling the damping force characteristic of the shock absorber 111 as in this embodiment, as illustrated in FIG. 8, in a region where the damping force of the shock absorber 111 during the compression is relatively small, the damping force of the shock absorber 111 during the compression can be increased to be larger than that in the case where the damping force characteristic of the shock absorber 111 is not changed. Furthermore, by controlling the damping force characteristic of the shock absorber 111 as in this embodiment, as illustrated in FIG. 8, in a region where the damping force of the shock absorber 111 during the compression is relatively large, the damping force of the shock absorber 111 during the compression can be reduced to be smaller than that in the case where the damping force characteristic of the shock absorber 111 is not changed.

Here, as illustrated in FIG. 8, when the damping force characteristic of the shock absorber 111 is controlled as in this embodiment, in the region where the damping force of the shock absorber 111 during the compression is relatively large, energy absorbed by the shock absorber 111 is reduced to be smaller by a magnitude indicated by a region A than that in the case where the damping force characteristic of the shock absorber 111 is not changed. Meanwhile, as illustrated in FIG. 8, when the damping force characteristic of the shock absorber 111 is controlled as in this embodiment, in the region where the damping force of the shock absorber 111 during the compression is relatively small, the energy absorbed by the shock absorber 111 can be increased to be larger by a magnitude indicated by a region B1 and a region B2 than that in the case where the damping force characteristic of the shock absorber 111 is not changed. Accordingly, by controlling the damping force characteristic of the shock absorber 111 as in this embodiment, it is possible to suppress the increase in the stroke of the shock absorber 111, which is caused by the restriction of the damping force of the shock absorber 111 during the compression and to further improve the riding comfort of the occupant at the time when the vehicle 100 lands on the ground.

The above-described landing damping force control for controlling the damping force characteristic of the shock absorber 111 such that the damping force of the shock absorber 111 approximates the target damping force DF2 can also be implemented by a method for changing the damping force characteristic of the shock absorber 111 in a stepless manner. However, in this embodiment, the method for changing the damping force characteristic of the shock absorber 111 stepwise is adopted. This is because, when the damping force characteristic is changed, a formula, a map, or the like that is used to calculate the damping force of the shock absorber 111 from the compressed/extended speed of the shock absorber 111 is changed. In addition, in the case where the damping force characteristic is changed, the compressed/extended speed of the shock absorber 111 is also changed. Accordingly, as the number of changes of the damping force characteristic of the shock absorber 111 is increased, work of calculating the damping force of the shock absorber 111 becomes more complicated. Accordingly, compared to the method for changing the damping force characteristic of the shock absorber 111 in the stepless manner, the method for changing the damping force characteristic of the shock absorber 111 stepwise can suppress the number of the changes of the damping force characteristic of the shock absorber 111. As a result, the damping force of the shock absorber 111 can be controlled easily.

A detailed description will hereinafter be made on the method for changing the damping force characteristic of the shock absorber 111 stepwise. Here, for the description of the method, the damping force characteristic of the shock absorber 111 in a state before the jump detecting section 3 detects the jump of the vehicle 100 is set as a first damping force characteristic C1.

In the landing damping force control that is executed after landing of the vehicle 100, in a state where the compression speed of the shock absorber 111 is lower than a prescribed speed, the control section 4 of the controller 1 according to this embodiment sets the damping force characteristic of the shock absorber 111 to a second damping force characteristic C2 that is harder than the first damping force characteristic C1. That is, in the case where the compression speed of the shock absorber 111 is the same, the damping force of the shock absorber 111 with the second damping force characteristic C2 is larger than the damping force of the shock absorber 111 with the first damping force characteristic C1. In FIG. 8, in a period from the time T2 to time T4 and a period from time T5 to the time T3, the compression speed of the shock absorber 111 is lower than the prescribed speed. In addition, in this embodiment, in all the periods in which the compression speed of the shock absorber 111 is lower than the prescribed speed, the damping force characteristic of the shock absorber 111 is the second damping force characteristic C2. In at least a part of any of the periods in which the compression speed of the shock absorber 111 is lower than the prescribed speed, it is possible to suppress the increase in the stroke of the shock absorber 111, which is caused by the restriction of the damping force of the shock absorber 111 during the compression, as long as the damping force characteristic of the shock absorber 111 is the second damping force characteristic C2.

In the landing damping force control that is executed after landing of the vehicle 100, in a state where the compression speed of the shock absorber 111 is equal to or higher than the prescribed speed, the control section 4 of the controller 1 according to this embodiment sets the damping force characteristic of the shock absorber 111 to a third damping force characteristic C3 that is softer than the second damping force characteristic C2. That is, in the case where the compression speed of the shock absorber 111 is the same, the damping force of the shock absorber 111 with the third damping force characteristic C3 is smaller than the damping force of the shock absorber 111 with the second damping force characteristic C2. In FIG. 8, in a period from the time T4 to the time T5, the compression speed of the shock absorber 111 is equal to or higher than the prescribed speed. That is, in FIG. 8, in the period from the time T4 to the time T5, the damping force characteristic of the shock absorber 111 is the third damping force characteristic C3. Timing at which the damping force characteristic of the shock absorber 111 is set to the third damping force characteristic C3 may be timing before the compression speed of the shock absorber 111 becomes equal to or higher than the prescribed speed. In addition, timing at which the damping force characteristic of the shock absorber 111 is changed from the third damping force characteristic C3 to another damping force characteristic may be timing after the compression speed of the shock absorber 111 becomes smaller than the prescribed speed.

When the damping force characteristic of the shock absorber 111 is changed stepwise, just as described, the damping force characteristic of the shock absorber 111 can be controlled in the manner to approximate the target damping force DF2. By the way, the control section 4 may change the damping force characteristic that is changed to the second damping force characteristic C2 according to the period during the single landing damping force control. Similarly, the control section 4 may change the damping force characteristic that is changed to the third damping force characteristic C3 according to the period during the single landing damping force control. However, in this embodiment, during the single landing damping force control, the control section 4 uses the single damping force characteristic as the second damping force characteristic C2 and uses the single damping force characteristic as the third damping force characteristic C3. That is, in this embodiment, the control section 4 is configured to output the command signal with a constant value at the time of setting the second damping force characteristic C2 during the single landing damping force control. In addition, the control section 4 is configured to output the command signal with the constant value at the time of setting the third damping force characteristic C3 during the single landing damping force control. This is because, as described above, the damping force of the shock absorber 111 can be controlled easily as the number of the changes of the damping force characteristic of the shock absorber 111 is reduced.

Here, the controller 1 according to this embodiment can receive the signal corresponding to the speed of the vehicle 100 from the signal output device 115. That is, the controller 1 according to this embodiment can grasp the speed of the vehicle 100. In such a case, at least for each time of the landing damping force control, the control section 4 preferably changes the damping force characteristic used as the second damping force characteristic C2 and the damping force characteristic used as the third damping force characteristic C3 according to the speed of the vehicle 100. This is because the kinetic energy at the time of landing of the vehicle 100 differs by the speed of the vehicle 100. Accordingly, at least for each time of the landing damping force control, the damping force characteristic used as the second damping force characteristic C2 and the damping force characteristic used as the third damping force characteristic C3 are changed according to the speed of the vehicle 100. In this way, it is possible to use the further preferred damping force characteristic as each of the second damping force characteristic C2 and the third damping force characteristic C3 and to further improve the riding comfort of the occupant at the time of landing of the vehicle 100.

The compression speed of the shock absorber 111 can be calculated by any of various methods.

For example, the controller 1 according to this embodiment includes the unsprung acceleration sensor 116 that detects the vertical acceleration of the unsprung portion of the vehicle 100. In the case where vertical motion of the vehicle body 101 as a sprung portion of the vehicle 100 and vertical motion of the unsprung portion are compared after landing of the vehicle 100, the vertical motion of the vehicle body 101 is slower than the vertical motion of the unsprung portion. Accordingly, it is possible to calculate the rough relative distance between the vehicle body 101 and the unsprung portion from the detection value of the unsprung acceleration sensor 116. That is, it is possible to calculate the rough stroke of the shock absorber 111 from the detection value of the unsprung acceleration sensor 116 and to calculate the rough compression speed of the shock absorber 111.

More specifically, in this embodiment, the control section 4 calculates the compression speed of the shock absorber 111 as follows on the basis of the detection value of the unsprung acceleration sensor 116. As described with reference to FIG. 6, in a compression process of the shock absorber 111 after landing of the vehicle 100, after the compression speed of the shock absorber 111 is increased, the compression speed of the shock absorber 111 is reduced. That is, in the compression process of the shock absorber 111 after landing of the vehicle 100, there is a state where compression acceleration of the shock absorber 111 becomes the maximum while the compression speed of the shock absorber 111 is increased. In this embodiment, the state where the compression acceleration of the shock absorber 111 becomes the maximum is calculated from the detection value of the unsprung acceleration sensor 116.

Further more specifically, in this embodiment, the control section 4 differentiates the detection value of the unsprung acceleration sensor 116 so as to detect a state where a sign of jerk is changed from positive to negative. This state corresponds to the state where the compression acceleration of the shock absorber 111 becomes the maximum. In the compression process of the shock absorber 111 after landing of the vehicle 100, in the case where a state before the compression speed of the shock absorber 111 becomes the prescribed speed can be detected, it is possible to estimate that the compression speed of the shock absorber 111 becomes equal to or higher than the prescribed speed after first prescribed time from the state. In addition, in the case where the state before the compression speed of the shock absorber 111 becomes the prescribed speed can be detected, it is possible to estimate that the compression speed of the shock absorber 111 becomes lower than the prescribed speed after second prescribed time from the state that is later than the first prescribed time.

Here, the control section 4 preferably changes the above-described first prescribed time and second prescribed time according to the speed of the vehicle 100. This is because the kinetic energy at the time of landing of the vehicle 100 differs by the speed of the vehicle 100 and thus a magnitude of the change in the compression speed of the shock absorber 111 from the state of the shock absorber 111 calculated from the detection value of the unsprung acceleration sensor 116 varies. Accordingly, it is possible to further accurately estimate the compression speed of the shock absorber 111 by changing the above-described first prescribed time and second prescribed time according to the speed of the vehicle 100.

In the case where the vehicle 100 includes the vertical acceleration sensor that detects the vertical acceleration of the vehicle body 101, the relative distance between the vehicle body 101 and the unsprung portion can be calculated on the basis of the detection value of the vertical acceleration sensor and the detection value of the unsprung acceleration sensor 116. That is, it is possible to calculate the stroke of the shock absorber 111 and the compression speed of the shock absorber 111 on the basis of the detection value of the vertical acceleration sensor and the detection value of the unsprung acceleration sensor 116. In this case, for example, the control section 4 may differentiate the stroke of the shock absorber 111 to directly calculate the compression speed of the shock absorber 111.

When the compression speed of the shock absorber 111 is calculated on the basis of the detection value of the vertical acceleration sensor and the detection value of the unsprung acceleration sensor 116, it is possible to further accurately calculate the compression speed of the shock absorber 111. Meanwhile, when the compression speed of the shock absorber 111 is calculated only on the basis of the detection value of the unsprung acceleration sensor 116, the control configuration can be simplified.

In the case where the vehicle 100 includes the stroke sensor that measures the relative distance between the vehicle body 101 and the unsprung portion, it is possible to calculate the stroke of the shock absorber 111 on the basis of the detection value of the stroke sensor and to calculate the compression speed of the shock absorber 111. In this case, for example, the control section 4 may differentiate the stroke of the shock absorber 111 to directly calculate the compression speed of the shock absorber 111. However, as described above, in the case where the stroke sensor is used for the off-road vehicle, the failure of the stroke sensor is concerned. For this reason, the vehicle 100 is configured not to use the stroke sensor. In this way, it is possible to improve the durability of the vehicle 100.

<Operation of Controller>

Next, a description will be made on operation of the controller 1.

FIG. 9 is a flowchart illustrating the operation of the controller according to the embodiment of the present invention.

When a control initiation condition is satisfied, in step S10, the controller 1 initiates the control illustrated in FIG. 9. The control initiation condition is that an engine of the vehicle 100 is started, or the like. Step S20 is a jump detection step. In step S20, the jump detecting section 3 of the controller 1 determines whether the vehicle 100 has jumped. The jump detecting section 3 repeats the jump detection step in step S20 until determining that the vehicle 100 has jumped, in other words, until detecting that the vehicle 100 has jumped. When the jump detecting section 3 detects the jump of the vehicle 100, the processing of the controller 1 proceeds to step S30.

Step S30 is a landing damping force control step. In step S30, the control section 4 of the controller 1 executes the control for restricting the damping force of the shock absorber 111 during the compression to be equal to or smaller than the prescribed damping force DF1. That is, in step S30, the control section 4 executes the landing damping force control. In this embodiment, in the landing damping force control step in step S30, the control section 4 executes step S31 to step S36 and controls the damping force characteristic of the shock absorber 111 stepwise such that the damping force of the shock absorber 111 during the compression approximates the target damping force DF2 that is the damping force equal to or smaller than the prescribed damping force DF1. A specific description will hereinafter be made on step S31 to step S36.

Step S31 is a damping force characteristic hardening changing step. In step S31, the control section 4 changes the damping force characteristic of the shock absorber 111 from the first damping force characteristic C1 to the second damping force characteristic C2, which is harder than the first damping force characteristic C1. Step S32 after step S31 is a damping force characteristic change determination step. In step S32, the control section 4 determines whether timing to change the damping force characteristic of the shock absorber 111 from the second damping force characteristic C2 to the third damping force characteristic C3 has arrived. The control section 4 repeats step S32 until the timing to change the damping force characteristic of the shock absorber 111 from the second damping force characteristic C2 to the third damping force characteristic C3 arrives. In the case where the timing to change the damping force characteristic of the shock absorber 111 from the second damping force characteristic C2 to the third damping force characteristic C3 has arrived, the processing proceeds to step S33.

Step S33 is a damping force characteristic softening changing step. In step S33, the control section 4 changes the damping force characteristic of the shock absorber 111 from the second damping force characteristic C2 to the third damping force characteristic C3, which is softer than the second damping force characteristic C2. Step S34 after step S33 is the damping force characteristic change determination step. In step S34, the control section 4 determines whether timing to change the damping force characteristic of the shock absorber 111 from the third damping force characteristic C3 to the second damping force characteristic C2 has arrived. The control section 4 repeats step S34 until the timing to change the damping force characteristic of the shock absorber 111 from the third damping force characteristic C3 to the second damping force characteristic C2 arrives. In the case where the timing to change the damping force characteristic of the shock absorber 111 from the third damping force characteristic C3 to the second damping force characteristic C2 has arrived, the processing proceeds to step S35.

Step S35 is the damping force characteristic hardening changing step. In step S35, the control section 4 changes the damping force characteristic of the shock absorber 111 from the third damping force characteristic C3 to the second damping force characteristic C2, which is harder than the third damping force characteristic C3. Step S36 after step S35 is a termination determination step. In step S36, the control section 4 determines whether to terminate the landing damping force control. The control section 4 repeats step S36 until determining to terminate the landing damping force control. When the control section 4 determines to terminate the landing damping force control, processing proceeds to step S40, and the control section 4 terminates the control illustrated in FIG. 9. A condition that the control section 4 determines to terminate the landing damping force control is termination of the first compression process of the shock absorber 111 after the jump detecting section 3 detects the jump of the vehicle 100, for example.

<Effects of Controller>

The controller 1 according to this embodiment is mounted to the vehicle 100, which includes the shock absorber 111 in the damping force adjustment type between the vehicle body 101 and the wheel 103, and controls the damping force of the shock absorber 111. The controller 1 includes the jump detecting section 3 and the control section 4. The jump detecting section 3 detects that the vehicle 100 has jumped. When the jump detecting section 3 detects the jump of the vehicle 100, the control section 4 executes the landing damping force control to restrict the damping force of the shock absorber 111 during the compression to be equal to or smaller than the prescribed damping force DF1.

As described above, with the controller 1 that is configured as described above, it is possible to suppress the instantaneous shock caused by the maximum stroke of the shock absorber 111 and is also possible to suppress the instantaneous shock caused by the shock absorber 111 that is too stiff when the vehicle 100 that has jumped lands on the ground. Therefore, with the controller 1 that is configured as described above, it is possible to improve the riding comfort of the occupant at the time of landing of the vehicle 100 in comparison with the background art.

Preferably, the control section 4 of the controller 1 is configured to control the damping force characteristic of the shock absorber 111 such that the damping force of the shock absorber 111 during the compression approximates the target damping force DF2 that is the damping force equal to or smaller than the prescribed damping force DF1 in the landing damping force control.

With the controller 1 that is configured as described above, it is possible to suppress the increase in the stroke of the shock absorber 111, which is caused by the restriction of the damping force of the shock absorber 111 during the compression, and to thereby further improve the riding comfort of the occupant at the time of landing of the vehicle 100.

Preferably, the control section 4 of the controller 1 is configured to control the damping force characteristic of the shock absorber 111 as follows in the landing damping force control for controlling the damping force characteristic of the shock absorber 111 such that the damping force of the shock absorber 111 approximates the target damping force DF2. The damping force characteristic of the shock absorber 111 in the state before the jump detecting section 3 detects the jump of the vehicle 100 is set as the first damping force characteristic C1. In this case, in the landing damping force control, in at least the part of any of the periods in which the compressed speed of the shock absorber 111 is lower than the prescribed speed, the control section 4 sets the damping force characteristic of the shock absorber 111 to the second damping force characteristic C2 that is harder than the first damping force characteristic C1. In addition, in the landing damping force control, in the state where the compression speed of the shock absorber 111 is equal to or higher than the prescribed speed, the control section 4 sets the damping force characteristic of the shock absorber 111 to the third damping force characteristic C3 that is softer than the second damping force characteristic C2.

The damping force characteristic of the shock absorber 111 is changed stepwise as described above. In this way, compared to the case where the damping force characteristic of the shock absorber 111 is changed in the stepless manner, it is possible to suppress the number of the changes of the damping force characteristic of the shock absorber 111. As a result, the damping force of the shock absorber 111 can be controlled easily.

Preferably, the control section 4 is configured to output the command signal at the constant value when changing the damping force characteristic of the shock absorber 111 stepwise to the second damping force characteristic C2. In addition, the control section 4 is configured to output the command signal at the constant value when changing the damping force characteristic of the shock absorber 111 stepwise to the third damping force characteristic C3.

When the controller 1 is configured as described above, it is possible to further suppress the number of the changes of the damping force characteristic of the shock absorber 111 and to control the damping force of the shock absorber 111 easily.

Preferably, the vehicle 100, to which the controller 1 is mounted, is the off-road vehicle. The travel of the off-road vehicle including the jump can easily be assumed. Therefore, the controller 1 capable of improving the riding comfort of the occupant at the time when the vehicle 100 lands on the ground is preferably mounted to the off-road vehicle.

The description has been made so far on the controller 1 according to this embodiment. However, the controller according to the present invention is not limited to that in the description of this embodiment, and only a part of this embodiment may be implemented.

REFERENCE SIGNS LIST

1: Controller
2: Receiving section
3: Jump detecting section
4: Control section
100: Vehicle
101: Vehicle body
103: Wheel

103FL: Front left wheel
103FR: Front right wheel
103RL: Rear left wheel
103RR: Rear right wheel
110 (110FL, 110FR, 110RL, 110RR): Spring
111 (111FL, 111FR, 111RL, 111RR): Shock absorber
112 (112FL, 112FR, 112RL, 112RR): Actuator
113: Longitudinal acceleration sensor
114: Lateral acceleration sensor
115: Signal output device
116 (116FL, 116FR, 116RL, 116RR): Unsprung acceleration sensor
120: Road surface

The invention claimed is:

1. A controller (1) that is mounted to a vehicle (100) including a shock absorber (111) in a damping force adjustment arrangement between a vehicle body (101) and a wheel (103) and that controls a damping force of the shock absorber (111), the controller (1) comprising:
   a jump detecting section (3) detecting that the vehicle (100) has jumped; and
   a control section (4) that executes a landing damping force control that, when the jump detecting section (3) detects a jump of the vehicle (100), restricts the damping force of the shock absorber (111) during a compression due to the jump to be equal to or smaller than a prescribed damping force (DF1).

2. The controller (1) according to claim 1, wherein
   the control section (4) is configured to control a damping force characteristic of the shock absorber (111) such that the damping force of the shock absorber (111) during the compression approximates a target damping force (DF2) that is a damping force equal to or smaller than the prescribed damping force (DF1) in the landing damping force control.

3. The controller (1) according to claim 2, wherein
   when in a state before the jump detecting section (3) detects the jump of the vehicle (100) the damping force characteristic of the shock absorber (111) is set as a first damping force characteristic (C1),
   in the landing damping force control,
   the control section (4) is configured to:
   set the damping force characteristic of the shock absorber (111) to a second damping force characteristic (C2) that is harder than the first damping force characteristic (C1) in at least a part of a period in which a compression speed of the shock absorber (111) is lower than a prescribed speed; and
   set the damping force characteristic of the shock absorber (111) to a third damping force characteristic (C3) that is softer than the second damping force characteristic (C2) in a state where the compression speed of the shock absorber (111) is equal to or higher than the prescribed speed.

4. The controller (1) according to claim 3, wherein
   the control section (4) is:
   configured to output a command signal at a constant damping force characteristic value when setting the second damping force characteristic (C2); and
   configured to output a command signal at a constant damping force characteristic value when setting the third damping force characteristic (C3), such that changes in damping force characteristic are stepwise changes.

5. The controller (1) according to claim 1, wherein
   the control section (4) is configured to execute the landing damping force control in a first compression process of the shock absorber (111) after the jump detecting section (3) detects the jump of the vehicle (100).

6. A vehicle (100) comprising:
a vehicle body (101);
a wheel (103);
a shock absorber (111) in a damping force adjustment arrangement between the vehicle body (101) and the wheel (103); and
a controller (1) having
a jump detecting section (3) detecting that the vehicle (100) has jumped; and
a control section (4) that executes a landing damping force control, that when the jump detecting section (3) detects a jump of the vehicle (100), restricts a damping force of the shock absorber (111) during a compression due to the jump to be equal to or smaller than a prescribed damping force (DF1).

7. The vehicle (100) according to claim 6, wherein the vehicle (100) is an off-road vehicle.

8. A control method that is used for a vehicle (100) including a shock absorber (111) in a damping force adjustment arrangement between a vehicle body (101) and a wheel (103) and controls a damping force of the shock absorber (111), the control method comprising:

detecting that the vehicle (100) has jumped via a jump detecting section of a controller, wherein before detecting the vehicle (100) has jumped, a damping force characteristic of the shock absorber (111) is set as a first damping force characteristic (C1); and when a jump of the vehicle (100) is detected,
setting the damping force characteristic of the shock absorber (111) to a second damping force characteristic (C2) that is harder than the first damping force characteristic (C1) in at least a part of a period in which a compression speed of the shock absorber (111) is lower than a prescribed speed; and
restricting the damping force of the shock absorber (111) via the controller during a compression to prevent the damping force from increasing above a prescribed damping force (DF1) by setting the damping force characteristic of the shock absorber (111) to a third damping force characteristic (C3) that is softer than the second damping force characteristic (C2) in a state where the compression speed of the shock absorber (111) is equal to or higher than the prescribed speed.

\* \* \* \* \*